Feb. 18, 1969  F. SCHLEGEL  3,428,386

MODIFIED PETZVAL LENS ASSEMBLY

Filed Dec. 15, 1967

INVENTOR
FRANZ SCHLEGEL
By: Lew and Berman
Agents

United States Patent Office 3,428,386
Patented Feb. 18, 1969

3,428,386
MODIFIED PETZVAL LENS ASSEMBLY
Franz Schlegel, Munich, Germany, assignor to Optische Werke G. Rodenstock, Munich, Germany
Continuation-in-part of application Ser. No. 471,531, July 13, 1965. This application Dec. 15, 1967, Ser. No. 690,854
Claims priority, application Germany, June 9, 1967, O 12,547
U.S. Cl. 350—2
Int. Cl. G02b *13/14*
2 Claims

ABSTRACT OF THE DISCLOSURE

A modified Petzval objective whose front component has two convergent lenses and a divergent lens interposed between and air spaced from the convergent lenses. Two examples of lens assemblies having extremely high resolving power for infrared and for visible light respectively are given.

Reference to related application

This application is a continuation-in-part of my copending application Ser. No. 471,531, filed on July 13, 1965, and now abandoned.

Background of the invention

This invention relates to optical lens assemblies and, more particularly, to a modified Petzval lens assembly improved with respect to zonal aberration and spherical and comatic correction, particularly for large relative apertures up to approximately 1:1.2.

In a known modified Petzval lens assembly, the conventional convex lens in the component facing the longer intercept length is replaced by two lenses in order to keep the spherical zones small. However, this is not sufficient for certain purposes, even if glass having a high power of refraction is used for the lenses. In such cases, it is necessary to position the divergent lens of the component facing the longer intercept length between the two lenses replacing the conventional single convex lens. Arrangements of this type are known, and they produce very good images, particularly if the field is flattened by means of a Smyth lens.

The primary object of this invention is the provision of a further improved lens assembly of the Petzval type whose resolving power closely approaches the theoretical limit set by the wavelength of the diffracted light.

Summary of the invention

I have found that the definition obtained in an image produced by means of the known modified Petzval lens system can be improved significantly by air-spacing the three lenses of the first component directed toward the longer intercept length. The divergent lens of the first component should have an index of refraction $n_E$ which is greater by at least 0.16 than the index of refraction of either convergent lens whose indices are preferably different. A Smyth lens may be employed in the second component for flattening the image field. The Smyth lens should have an index of refraction $n_E$ of at least 1.7, and preferably 1.8 or higher.

Other features, additional objects and many of the attendant advantages of this invention will readily be apparent from the following detailed description of preferred embodiments when considered in connection with the appended drawing.

Description of the preferred embodiments

Figure 1:
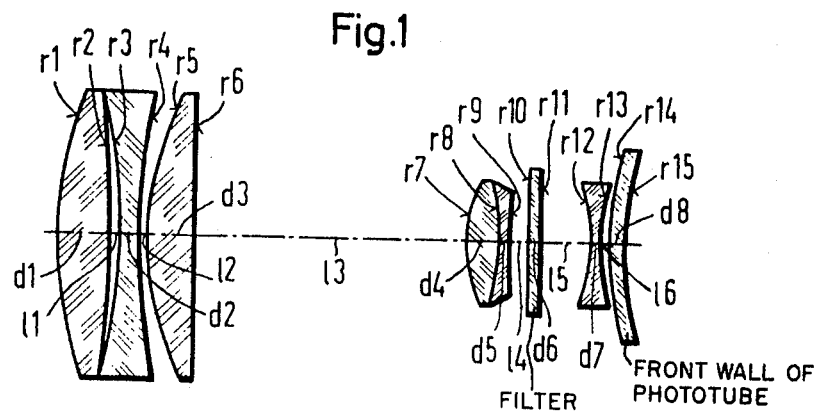
FIG. 1 shows a modified Petzval lens assembly of the invention in conventional section on its optical axis.

Referring to both figures of the drawing, the radii of curvature of the respective surfaces of the several lenses are indicated by $r$, the radii having numerical subscripts proceeding in ascending order from the side of the longer intercept length to the side of the shorter intercept length. Similarly, the thicknesses of the several lenses are indicated by $d$, again with numerical subscripts arranged in ascending order from the side of the longer intercept length to the side of the shorter intercept length. The axial spacings, along the optical axis, of the several lenses are indicated by $l$, again with subscripts arranged in ascending order from the side of the longer intercept length to the side of the shorter intercept length.

Pertinent data with respect to the lens assembly shown in FIG. 1 of the drawing are given in the following Table 1 and include the index of refraction $n_E$ and the Abbé number $V_E$ of the glass employed where relevant.

TABLE 1

| | | $n_E$ | $V_E$ |
|---|---|---|---|
| $r_1 = +1.133$ | | | |
| $r_2 = -2.712$ | $d_1 = 0.149$ | 1.605 | 60.5 |
| | $l_1 = 0.030$ | | |
| $r_3 = -1.471$ | | | |
| | $d_2 = 0.0485$ | 1.792 | 25.9 |
| $r_4 = +2.117$ | | | |
| | $l_2 = 0.015$ | | |
| $r_5 = +0.869$ | | | |
| | $d_3 = 0.1365$ | 1.623 | 60.1 |
| $r_6 = \infty$ | | | |
| | $l_3 = 0.786$ | | |
| $r_7 = +0.358$ | | | |
| | $d_4 = 0.103$ | | |
| $r_8 = 0.564$ | | | |
| | $d_5 = 0.0273$ | 1.813 | 25.3 |
| $r_9 = +5.80$ | | | |
| | $l_4 = 0.0516$ | | |
| $r_{10} = \infty$ | | | |
| | $d_6 = 0.030$ (Filter) | | |
| $r_{11} = \infty$ | | | |
| | $l_5 = 0.1585$ | | |
| $r_{12} = -0.433$ | | | |
| | $d_7 = 0.015$ | 1.813 | 25.3 |
| $r_{13} = +0.640$ | | | |
| | $l_6 = 0.0212$ | | |
| $r_{14} = +0.948$ | | | |
| | $d_8 = 0.046$ (Tube wall) | | |
| $r_{15} = +0.948$ | | | |
| For Infra-red: $S'_0 = 0$; $f' = 1:1.2$ | | | |

The illustrated lens assembly is spherically corrected at full aperture for an image angle of 12° so as to permit high-contrast reproduction of very small details close to the limit of resolution set by diffraction of the wave length employed.

As illustrated in FIG. 1, the lens assembly is employed with a conventional photosensitive camera tube whose glass envelope only is shown in the drawing and represented in Table 1 by its thickness $d_8$ and radii of curvature $r_{14}$ and $r_{15}$. The planoparallel element of thickness $d_6$ is a filter conventional in itself. Neither the filter nor the front wall of the tube envelope reduce the quality of the image produced.

This picture quality is due mainly to the separation of the three lenses in the component directed toward the longer intercept length by air spaces, and to the high index of refraction of the divergent lens in that component which must be at least 1.7, but preferably is at least 1.8, and must be higher than that of the two convergent lenses by at least 0.16.

Within these limits, individual values may vary somewhat, the radii of curvature $r$ being such that the resultant surface refraction powers differ from those listed in Table 1 by not more than ±5% of the total refractive power of the lens assembly. Similarly, the thicknesses $d$ and spacings $l$ may be increased or decreased by 10% of the focal length of the lens assembly without losing all benefits of the invention. The glasses employed may have indices of refraction $n_E$ within ±0.03 of the values listed, and the Abbe numbers $V_E$ may be modified by not more than ±5.

Figure 2:
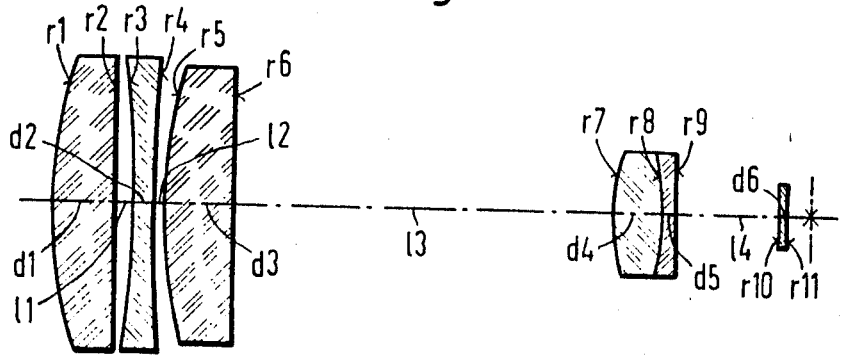
FIG. 2 shows another embodiment of the invention in a view corresponding to that of FIG. 1.

The lens assembly illustrated in FIG. 2 has a front component of two convergent lenses and one divergent, air-spaced, central lens in common with the embodiment of the invention shown in FIG. 1. It produces images of a definition closely approaching the theoretical limit within a small field angle of not more than 6° with a relative aperture better than 1:2, and typically 1:1.7. The sharpest image is produced on the side of the shorter intercept length in a surface which is convexly curved toward the lens assembly to match the curvature of the photocathode in an associated light sensitive tube, not itself shown.

While the lens assembly shown in FIG. 1 yields best results at wavelengths greater than 0.001 mm., that is in the infrared, permitting a relative aperture of 1:1.2 because of the relatively great diffraction of such radiation, the lens assembly illustrated in FIG. 2 is sufficiently corrected to permit its use with visible and near ultraviolet light with equally good results. The relative aperture may be chosen between 1:1.5 and 1:2.0, and preferably is approximately 1.7. The definition is uniformly excellent over a field of approximately 6°.

As in the afore-described lens assembly, the two principal components of the assembly are widely separated. The component directed toward the longer intercept length has three air-spaced lenses, a divergent lens being interposed between two convergent ones. The second component includes a compound lens which is followed, with a substantial air space, by a Smyth lens as a field flattener.

The relevant parameters of the lens assembly of FIG. 2 are listed below in Table 2, the limitations and relationships of these parameters being analogous to or identical with those discussed above with reference to FIG. 1. As is conventional, values of thickness and spacing are in units of length for a lens assembly whose effective focal length is 100 units.

TABLE 2
$f'=100$

|  |  | $n_E$ | $V_E$ |
|---|---|---|---|
| $r_1 = +100.2$ | | | |
| | $d_1 = 13.4$ | 1.605 | 60.4 |
| $r_2 = +4,070$ | | | |
| | $l_1 = 4.26$ | | |
| $r_3 = -196.2$ | | | |
| | $d_2 = 4.57$ | 1.792 | 25.9 |
| $r_4 = +498.5$ | | | |
| | $l_2 = 1.3$ | | |
| $r_5 = +112.0$ | | | |
| | $d_3 = 13.7$ | 1.625 | 56.6 |
| $r_6 = +3,190$ | | | |
| | $l_3 = 80.5$ | | |
| $r_7 = +35.65$ | | | |
| | $d_4 = 10.3$ | 1.625 | 56.6 |
| $r_8 = -57.7$ | | | |
| | $d_5 = 2.71$ | 1.702 | 38.3 |
| $r_9 = +201.5$ | | | |
| | $l_4 = 21.8$ | | |
| $r_{10} = -72.2$ | | | |
| | $d_6 = 1.55$ | 1.813 | 25.2 |
| $r_{11} = +64.7$ | | | |
| | $s' = 5.33$ | | |

It should be understood, of course, that the foregoing disclosure relates only to preferred embodiments of the invention, and that it is intended to cover all changes and modifications of the examples of the invention herein chosen for the purpose of the disclosure which do not depart from the spirit and scope of the invention as set forth in the appended claims.

What is claimed is:

1. A modified Petzval lens assembly comprising in combination:
   (a) a first component facing the longer intercept length,
      (1) said first component including two convergent lenses and a divergent lens interposed between said convergent lenses and defining respective air spaces with said convergent lenses; and
   (b) a second component facing the shorter intercept length and widely separated from said first component,
      (1) said second component including, in air-spaced sequence away from said first component, a cemented doublet, a filter, and a divergent lens,
      (2) the radii of curvature $r$, thicknesses $d$, spacings $l$, indices of refraction $n_E$, and Abbe numbers $V_E$ of said lenses, of said doublet, and of said filter being substantially as listed in the following table,
      (3) the relative aperture of the assembly being approximately 1:1.2 for infrared radiation,
      (4) the radii $r$, thicknesses $d$, and spacings $l$ in said Table having numerical subscripts in ascending order from the side of the longer intercept length toward the side of the shorter intercept length,

TABLE

|  |  | $n_E$ | $V_E$ |
|---|---|---|---|
| $r_1 = +1.133$ | | | |
| | $d_1 = 0.149$ | 1.605 | 60.5 |
| $r_2 = -2.712$ | | | |
| | $l_1 = 0.030$ | | |
| $r_3 = -1.471$ | | | |
| | $d_2 = 0.0485$ | 1.792 | 25.9 |
| $r_4 = +2.117$ | | | |
| | $l_2 = 0.015$ | | |
| $r_5 = +0.869$ | | | |
| | $d_3 = 0.1365$ | 1.623 | 60.1 |
| $r_6 = \infty$ | | | |
| | $l_3 = 0.786$ | | |
| $r_7 = +0.358$ | | | |
| | $d_4 = 0.103$ | 1.625 | 58.6 |
| $r_8 = -0.564$ | | | |
| | $d_5 = 0.0273$ | 1.813 | 25.3 |
| $r_9 = +5.80$ | | | |
| | $l_4 = 0.0516$ | | |
| $r_{10} = \infty$ | | | |
| | $d_6 = 0.030$ (Filter) | | |
| $r_{11} = \infty$ | | | |
| | $l_5 = 0.1585$ | | |
| $r_{12} = -0.433$ | | | |
| | $d_7 = 0.015$ | 1.813 | 25.3 |
| $r_{13} = +0.640$ | | | |

2. A modified Petzval lens assembly comprising in combination:
   (a) a first component facing the longer intercept length,
      (1) said first component including two convergent lenses and a divergent lens interposed between said convergent lenses and defining respective air spaces with said convergent lenses; and
   (b) a second component facing the shorter intercept length and widely separated from said first component,
      (1) said second component including, in air-spaced sequence away from said first component, a cemented doublet, and a divergent lens,
      (2) the radii of curvature $r$, thicknesses $d$, spacings $l$, indices of refraction $n_E$, and Abbe numbers $V_E$ of said lenses and of said doublet being substantially as listed in the following table,
      (3) the relative aperture of the assembly being approximately 1:1.7 for infrared radiation,
      (4) the radii $r$, thicknesses $d$, and spacings $l$ in said table having numerical subscripts in ascending order from the side of the longer intercept length toward the side of the shorter intercept length,

TABLE $f' = 100$

| | | $n_E$ | $V_E$ |
|---|---|---|---|
| $r_1 = +100.2$ | | | |
| | $d_1 = 13.4$ | 1.605 | 60.4 |
| $r_2 = +4,070$ | | | |
| | $l_1 = 4.26$ | | |
| $r_3 = -196.2$ | | | |
| | $d_2 = 4.57$ | 1.792 | 25.9 |
| $r_4 = +498.5$ | | | |
| | $l_2 = 1.3$ | | |
| $r_5 = +112.0$ | | | |
| | $d_3 = 13.7$ | 1.625 | 56.6 |
| $r_6 = +3,190$ | | | |
| | $l_3 = 80.5$ | | |
| $r_7 = +35.65$ | | | |
| | $d_4 = 10.3$ | 1.625 | 56.6 |
| $r_8 = -57.7$ | | | |
| | $d_5 = 2.71$ | 1.702 | 38.3 |
| $r_9 = +201.5$ | | | |
| | $l_4 = 21.8$ | | |
| $r_{10} = -72.2$ | | | |
| | $d_6 = 1.55$ | 1.813 | 25.2 |
| $r_{11} = +64.7$ | | | |

References Cited

UNITED STATES PATENTS 3,255,664   6/1966   Smith _____ 350—215
3,320,016   5/1967   Van Graafeiland ____ 350—215

FOREIGN PATENTS 1,358,101   3/1964   France.

DAVID SCHONBERG, *Primary Examiner.*
RONALD J. STERN, *Assistant Examiner.*

U.S. Cl. X.R.

350—176, 196, 215, 216